United States Patent
Ishikawa et al.

(10) Patent No.: US 6,702,466 B2
(45) Date of Patent: Mar. 9, 2004

(54) CERAMIC DYNAMIC-PRESSURE BEARING, MOTOR HAVING BEARING, HARD DISK DRIVE, POLYGON SCANNER, AND METHOD FOR MANUFACTURING CERAMIC DYNAMIC-PRESSURE BEARING

(75) Inventors: Hironobu Ishikawa, Aichi (JP); Tetsuji Yogo, Aichi (JP); Junya Moribe, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 27 days.

(21) Appl. No.: 10/123,160

(22) Filed: Apr. 17, 2002

(65) Prior Publication Data

US 2002/0186903 A1 Dec. 12, 2002

Related U.S. Application Data

(63) Continuation-in-part of application No. 09/686,927, filed on Oct. 12, 2000, now abandoned.

(30) Foreign Application Priority Data

Oct. 15, 1999 (JP) .............................. 11-293864
Apr. 19, 2001 (JP) ........................ 2001-121621

(51) Int. Cl.$^7$ ............................................. F16C 32/06
(52) U.S. Cl. ......................... 384/112; 384/292; 384/100
(58) Field of Search .............................. 384/100, 107, 384/114, 279, 902, 291, 292; 884/108, 109, 112, 113

(56) References Cited

U.S. PATENT DOCUMENTS

| | | | |
|---|---|---|---|
| 3,284,144 A | | 11/1966 | Moore et al. |
| 4,332,428 A | * | 6/1982 | Maruyama .................. 310/90.5 |
| 4,509,803 A | | 4/1985 | Takenaka et al. |
| 4,575,264 A | * | 3/1986 | Mizobuchi et al. ......... 384/369 |
| 4,711,706 A | * | 12/1987 | Wasel et al. ................. 205/667 |
| 4,994,418 A | * | 2/1991 | Yamakawa et al. ........ 501/65.2 |
| H974 H | * | 11/1991 | Mizobuchi et al. .... 29/898.041 |
| 5,127,744 A | | 7/1992 | White et al. |
| 5,271,677 A | * | 12/1993 | Sherman et al. ............ 384/114 |
| 5,289,067 A | * | 2/1994 | Tanaka et al. ............. 310/90.5 |
| 5,366,298 A | * | 11/1994 | Toshimitsu et al. ......... 384/107 |
| 5,511,959 A | * | 4/1996 | Tojo et al. .................. 418/55.1 |
| 5,532,729 A | * | 7/1996 | Nakasugi ..................... 347/257 |
| 5,581,039 A | * | 12/1996 | Yasutomi et al. .............. 73/768 |
| 5,606,448 A | * | 2/1997 | Suzuki et al. ................ 359/200 |
| 5,667,898 A | * | 9/1997 | Anderson et al. ........... 428/469 |
| 5,688,053 A | * | 11/1997 | Itoh et al. .................... 384/100 |
| 5,691,833 A | * | 11/1997 | Sakamoto et al. .......... 359/200 |

(List continued on next page.)

FOREIGN PATENT DOCUMENTS

| | | |
|---|---|---|
| JP | 2-217380 | 8/1990 |
| JP | 4-54307 | 2/1992 |
| JP | 6-100226 | 12/1994 |

*Primary Examiner*—David A. Bucci
*Assistant Examiner*—Julie K. Smith
(74) *Attorney, Agent, or Firm*—Sughrue Mion, PLLC

(57) ABSTRACT

A ceramic dynamic-pressure bearing having dynamic-pressure grooves. At least a portion including a surface (dynamic-pressure gap definition surface) facing a dynamic-pressure gap is formed of ceramic, and dynamic-pressure grooves GV are formed, by electrolytic etching, on the ceramic dynamic-pressure gap definition surface such that, on a cross section of the groove GV taken perpendicular to the longitudinal direction of the groove GV, a curvature portion R having a radius of 3–7 μm is formed at a meeting position where a groove sidewall surface SG and a groove bottom surface BG meet. In a preferred embodiment, a large number of pores K are formed on one or more of the rotary surfaces M of the dynamic-pressure bearing formed of ceramic such that the surface porosity falls in the range of 10 to 60%.

24 Claims, 14 Drawing Sheets

U.S. PATENT DOCUMENTS

| | | | | |
|---|---|---|---|---|
| 5,709,480 A | * | 1/1998 | Hong | 384/100 |
| 5,711,612 A | * | 1/1998 | Itoh et al. | 384/107 |
| 5,729,404 A | * | 3/1998 | Dunfield et al. | 360/99.08 |
| 5,743,655 A | * | 4/1998 | Slavin et al. | 384/107 |
| 5,792,717 A | * | 8/1998 | Takayama | 501/88 |
| 5,834,870 A | * | 11/1998 | Tokushima et al. | 310/90 |
| 5,906,440 A | * | 5/1999 | Yoshitsugu et al. | 384/115 |
| 5,927,861 A | * | 7/1999 | Yamashita et al. | 384/287 |
| 6,072,660 A | * | 6/2000 | Teshima | 360/99.08 |

\* cited by examiner

CERAMIC DYNAMIC-PRESSURE BEARING, MOTOR HAVING BEARING, HARD DISK DRIVE, POLYGON SCANNER, AND METHOD FOR MANUFACTURING CERAMIC DYNAMIC-PRESSURE BEARING

CROSS REFERENCE TO RELATED APPLICATIONS

This application is a continuation-in-part of application Ser. No. 09/686,927 filed Oct. 12, 2000 now abandoned, the disclosure of which is incorporated herein by reference.

BACKGROUND OF THE INVENTION

1. Field of the Invention

The present invention relates to a ceramic dynamic-pressure bearing, a motor having a bearing, a hard disk drive, a polygon scanner and method for manufacturing a ceramic dynamic-pressure bearing.

2. Description of the Related Art

Conventionally, a ball bearing has often been used as a bearing for the shaft of a motor serving as a drive unit of electric equipment. High-speed rotation of a motor has been rapidly implemented in precision equipment, such as peripheral equipment of a computer. In this connection, in order to obtain excellent bearing performance with low rotation-speed fluctuation and reduced noise and vibration, or in order to elongate bearing service life, a dynamic-pressure bearing, which uses fluid, such as air, as a medium, has been employed. The dynamic-pressure bearing operates in the following manner: when, for example, a spindle and a bearing member disposed to surround the spindle undergo relative rotation about an axis, the axis of rotation is supported by the action of fluid dynamic-pressure generated in the gap formed between the outer circumferential surface of the spindle and the inner circumferential surface of the bearing member. Also, a certain other bearing is configured such that the thrust face of a spindle or that of a bearing member is supported by action of dynamic pressure.

3. Problems to be Solved by the Invention

When a dynamic-pressure bearing as described above is in a high-speed rotation state, in which generated dynamic-pressure is sufficiently high, two members which face each other with a dynamic-pressure gap present therebetween do not come into contact with each other. However, at the time of starting or stopping, when rotational speed is low, sufficiently high dynamic pressure is not generated; thus, the two members come into contact with each other. Component members of such a dynamic-pressure bearing have generally been formed of a metal, such as stainless steel, and in some cases have been further coated with resin or like material. However, the two metallic members may cause a problem of wear or seize-up caused by mutual contact thereof at the time of starting or stopping.

In order to prevent the above-described seize-up of a dynamic-pressure bearing at the time of starting or stopping, either or both of the spindle and the bearing have been formed of a ceramic, such as alumina, which is not prone to seize-up and exhibits excellent wear resistance.

However, even when a dynamic-pressure component is formed of a ceramic, a problem may arise such that vibration occurs during rotation of a spindle, which hinders smooth rotation of the spindle. Further, when one of the spindle and the bearing is formed of a metal, seize-up may occur. In order to prevent this problem, a ceramic dynamic-pressure bearing has been proposed, configured such that the two members which face each other with a dynamic-pressure gap present therebetween are formed of ceramic. However, sufficiently smooth rotation has still not been realized.

Furthermore, in order to increase dynamic pressure to be generated, a dynamic-pressure bearing has employed dynamic-pressure grooves formed on a dynamic-pressure gap definition surface. In the case of a ceramic dynamic-pressure bearing, the dynamic-pressure grooves have been engraved by sandblasting.

However, a sandblasting process for engraving dynamic-pressure grooves involves masking with a wear-resistant material, which is troublesome. Since blasting of abrasive grains tends to be uneven, variations in groove depth tend to arise. Additionally, since the number of workpieces which can simultaneously undergo a groove formation process is limited, productivity is poor. Further, the inner surface, particularly a bottom surface, of a dynamic-pressure groove thus formed tends to become rough, and a meeting portion where a sidewall surface and a bottom surface meet tends to assume an irregular sharp shape, thereby preventing smooth generation of dynamic pressure and potentially causing center runout or vibration.

SUMMARY OF THE INVENTION

It is therefore a first object of the present invention to provide a ceramic dynamic-pressure bearing which can realize smooth rotation. A second object of the invention is to provide a ceramic dynamic-pressure bearing having dynamic-pressure grooves capable of smoothly generating dynamic pressure and allowing for excellent productivity, a method for manufacturing the dynamic-pressure bearing, and a motor having a bearing, a hard disk drive, and a polygon scanner which employ the dynamic-pressure bearing.

The above-described first object of the invention, has been achieved by providing:

(1) A ceramic dynamic-pressure bearing in which, when either a spindle or a bearing serving as a rotation body rotates relative to the other, the rotary surfaces (i.e., radial dynamic-pressure gap definition surfaces) of the spindle and the bearing come into a non-contacting state, at least the rotary surface of the spindle and/or the bearing is formed of a ceramic, and the surface porosity of the rotary surface is 10 to 60%.

When a ceramic material is used for a dynamic-pressure bearing, the surface state of the rotary surface of the ceramic component serving as a spindle or a bearing becomes important. That is, in general, fine pores are present on the surface of a ceramic component that has been subjected to polishing, due to dropping off of particles during the course of polishing; and the number, size, and distribution of such pores are considered to greatly effect the state of rotation of the dynamic-pressure bearing.

Specifically, when pores of large diameter are present on a rotary surface of the ceramic component, turbulence is generated in the fluid layer present between the spindle and the bearing upon rotation of, for example, the spindle, so that vibration of the spindle occurs. By contrast, when the number of pores present on a rotary surface of the ceramic component is excessively small, or when a large number of pores of small diameter are present on the rotary surface, adhesion easily occurs between the rotary surfaces of the spindle and the bearing, so that seize-up may occur when the spindle or the bearing is formed of a metal.

In the above first aspect of the present invention, because the surface porosity of the rotary surface formed of a ceramic is set to 10 to 60%, the size and number of pores become proper, so that occurrence of vibration or seize-up can be prevented. Further, in a dynamic-pressure bearing having a structure such that a rotation body (i.e., bearing member) is sandwiched between thrust plates, the occurrence of linking can be avoided.

The term "surface porosity" means the ratio of the total cross-sectional area of pores (the total area of cross sections of pores taken along a rotary surface) to the area of the rotary surface. When known dynamic-pressure grooves are formed on the rotary surface, the area of the dynamic-pressure grooves is omitted for calculation of the surface porosity. That is, in such case, the surface porosity is represented by (the total cross-sectional area of pores present on the rotary surface excluding a region where the dynamic-pressure grooves are formed)/(the area of the rotary surface excluding the region where the dynamic-pressure grooves are formed). This definition for surface porosity will be applied to the following description in the present specification.

(2) The ceramic dynamic-pressure bearing as described in (1) above, wherein the surface porosity of the rotary surface is 20 to 50%.

This embodiment of the invention limits the surface porosity to a more desirable range within the range defined in (1). Within the limited range, the above-described variation, seize-up, and linking can be prevented more effectively.

The above-described second object of the present invention has been achieved by providing a ceramic dynamic-pressure bearing comprising a dynamic-pressure gap formed between a first member and a second member, which undergo relative rotation about a predetermined axis of rotation, and the relative rotation of the first member and the second member generates fluid dynamic-pressure in the dynamic-pressure gap, wherein at least a portion of at least either the first member or the second member which includes a surface (hereinafter referred to as a "dynamic-pressure gap definition surface") facing the dynamic-pressure gap is formed of electrically conductive ceramic, and dynamic-pressure grooves are formed on the ceramic dynamic-pressure gap definition surface such that, on a cross section of a dynamic-pressure groove taken perpendicular to the longitudinal direction of the groove, a curvature portion having a radius of 3–7 μm is formed at a meeting position where a groove sidewall surface and a groove bottom surface meet.

According to the above-described configuration, on a cross section of a groove taken perpendicular to the longitudinal direction of the groove, a curvature portion having a radius of 3–7 μm is formed at a meeting position where a groove sidewall surface and a groove bottom surface meet, whereby dynamic pressure can be generated more smoothly, and the occurrence of center runout or vibration becomes unlikely. A curvature portion having a radius that is less than 3 μm fails to yield sufficient effect, and a curvature portion having a radius in excess of 7 μm is difficult to form for an ordinary width range of a dynamic-pressure groove.

The above-described ceramic dynamic-pressure bearing can be manufactured by electrolytically etching dynamic-pressure grooves on a dynamic-pressure gap definition surface formed of an electrically conductive ceramic. Electrolytic etching renders electrolytic concentration unlikely to occur at a meeting position where a groove sidewall surface and a groove bottom surface meet, and is therefore suitable for imparting a curved surface. Electrolytic etching can finish the inner surface of a dynamic-pressure groove more smoothly as compared with sandblasting, thereby contributing to smooth generation of dynamic pressure. Specifically, the bottom surface of a dynamic-pressure groove can be a smooth surface having an average roughness along the centerline of about not greater than 1.5 μm. The lower the average roughness along the centerline of the inner surface of a dynamic-pressure groove, the better. However, because of a trade-off between cost and reduction in roughness, setting a lower limit of about 0.001 μm in average roughness is appropriate. Average roughness along the centerline appearing in the present invention is an average roughness measured along the longitudinal direction of a groove by the method specified in JIS B0601 (1994).

A material consisting essentially of an electrically conductive inorganic compound phase that contains a predominant amount of one or more components selected from the group consisting of titanium nitride, titanium carbide, titanium boride, tungsten carbide, zirconium nitride, titanium carbonitride, silicon carbide, and niobium carbide exhibits good electrical conductivity in particular and can be favorably used in the present invention as a material for the electrically conductive ceramic. Alternatively, the electrically conductive inorganic compound phase may be formed of an electrically conductive oxide, such as titanium oxide (e.g., $TiO_2$), tin oxide ($SnO_2$), copper oxide ($Cu_2O$), chromium oxide ($Cr_2O_3$), or nickel oxide (NiO). Particularly, an electrical conductive inorganic compound phase that contains a predominant amount of titanium oxide exhibits good electrical conductivity and can enhance the strength of a composite ceramic. Therefore, such is favorably used in the present invention.

Preferably, the above-described conductive ceramic contains an electrically conductive inorganic compound phase in an amount of 50–98% by volume. In this case, the balance other than the electrically conductive compound phase can be a grain boundary phase derived from a sintering aid or, in order to enhance strength, a mixed phase of a grain boundary phase and a ceramic matrix phase formed of any one of alumina ceramic, zirconia ceramic, and silicon nitride ceramic. Since alumina ceramic, zirconia ceramic, and silicon nitride ceramic exhibit excellent wear resistance, selection of such a ceramic as the ceramic matrix can enhance wear resistance and thus can attain compatibility between good electrical conductivity and high mechanical durability.

The dynamic-pressure gap definition surface can be a radial dynamic-pressure gap definition surface located radially distant from the axis of rotation of the bearing. Specifically, the first member is formed into a spindle and is inserted into a reception hole formed in the second member; and the inner surface of the reception hole and the outer circumferential surface of the first member received inside the inner surface serve as radial dynamic-pressure gap definition surfaces, which define a radial dynamic-pressure gap therebetween.

For example, in a dynamic-pressure bearing having a structure shown in FIG. 1, the radial direction is a direction perpendicular to the axis of rotation (extending vertically in FIG. 1) of the spindle. For example, in FIG. 1, the outer circumferential surface of a spindle—which serves as the first member in a fixed condition-and the inner circumferential surface of a bearing member—which serves as the second member assuming the form of a cylindrical rotation body—serve as the radial dynamic-pressure gap definition surfaces. As described below, in the case of a bearing elongated along the axis of rotation, the extent to which sufficient radial dynamic-pressure is generated determines whether or not the axis of rotation is stably supported. Therefore, adjusting surface pores on the radial dynamic-pressure gap definition surfaces as specified in the present invention allows for the generation of sufficient dynamic pressure in the radial dynamic-pressure gap and effectively prevents or restrains adhesion wear, seize-up, or a like problem at the time of starting and stopping.

The dynamic-pressure gap definition surface can be a thrust dynamic-pressure gap definition surface formed at a certain location in the thrust direction relative to the axis of the rotation body. Specifically, the first member is disposed so as to face at least one end face of the second member with respect to the axis of rotation; and the end face of the second member and a face of the first member facing the end face serve as the thrust dynamic-pressure gap definition surfaces, which define a thrust dynamic-pressure gap therebetween.

For example, in the dynamic-pressure bearing having a structure shown in FIG. 1, the thrust direction is the axial direction of the spindle; i.e., a direction along which the axis of rotation extends (the vertical direction in FIG. 1). In FIG. 1, an end face of the bearing member—which serves as the second member assuming the form of a cylindrical rotation body—and a face of a thrust plate—which serves as the first member facing the end face of the bearing member with respect to the axis of rotation—serve as the thrust dynamic-pressure gap definition surfaces. The thrust dynamic-pressure gap definition surfaces may be slightly inclined from a plane perpendicular to the axis of rotation. As described below, in the case of a bearing which has a short length along the axis of rotation, the extent to which sufficient radial dynamic-pressure is generated determines whether or not the axis of rotation is stably supported. Therefore, adjusting surface pores on the thrust dynamic-pressure gap definition surfaces as specified in the present invention allows for the generation of sufficient dynamic pressure in the thrust dynamic-pressure gap and effectively prevents or restrains adhesion wear, seize-up, or wringing at the time of starting and stopping.

As shown in FIG. 1, a single bearing can have both a radial dynamic-pressure gap and a thrust dynamic-pressure gap. In this case, the first member (or the second member) as viewed from the standpoint of the radial dynamic-pressure gap and the first member (or the second member) as viewed from the standpoint of the thrust dynamic-pressure gap may be the same member or mutually different members depending on the form of the dynamic-pressure gaps. For example, in the case of FIG. 1, the second member is the bearing member as viewed from the standpoint of either dynamic-pressure gap; and the inner circumferential surface of the bearing member serves as the radial dynamic-pressure gap definition surface, whereas the opposite end faces of the bearing member serve as the thrust dynamic-pressure gap definition surfaces. As for the first member, the spindle is the first member as viewed from the standpoint of the radial dynamic-pressure gap, whereas a pair of thrust plates facing the corresponding opposite end faces of the bearing member is the first member as viewed from the standpoint of the thrust dynamic-pressure gap. The spindle is a nonrotating fixed shaft. Notably, as shown in FIG. 13, a bearing 251 is configured such that a spindle 212 is a rotating member, whereas a cylindrical bearing member 221 is a fixed member.

The dynamic-pressure bearing of the present invention can be configured such that the axial length thereof is longer than the outside diameter of the thrust dynamic-pressure gap definition surface, or the thrust dynamic-pressure gap is not formed such that the inclination of the rotation body during rotation is restricted by dynamic pressure generated in the radial dynamic-pressure gap. This defines, for example, a dynamic-pressure bearing having a long axial length as shown in FIG. 11. When a bearing member 35 serving as a rotation body inclines, the inclination is corrected by the action of pressure generated in a radial dynamic-pressure gap 38. By contrast, the dynamic-pressure bearing can also be configured such that the axial length thereof is shorter than the outside diameter of the thrust dynamic-pressure gap definition surface and such that the inclination of the rotation body during rotation is restricted mainly by dynamic pressure generated in the thrust dynamic-pressure gap. This defines, for example, a dynamic-pressure bearing having a short axial length as shown in FIG. 3. When a bearing member serving as a rotation body inclines, the inclination is corrected by the action of dynamic pressure generated in the thrust dynamic-pressure gaps.

Dynamic-pressure grooves may be formed on the dynamic-pressure gap definition surface. For example, formation of known dynamic-pressure grooves on the outer circumferential surface, which serves as the radial dynamic-pressure gap definition surface, of a rotary spindle can realize far smoother rotation. As shown in FIG. 2(a), a plurality of dynamic-pressure grooves can be formed on the outer circumferential surface of the spindle (on the radial dynamic-pressure gap definition surface) while being arranged at predetermined intervals along the circumferential direction. In the embodiment of FIG. 2(a), linear grooves are arrayed while being inclined at a certain angle with respect to a generatrix of the outer circumferential surface of the spindle. However, dynamic-pressure grooves in any other known form can be used. For example, dynamic-pressure grooves can be used in a so-called herringbone form. Specifically, angle (boomerang-like) grooves are formed on the outer circumferential surface at predetermined intervals along the entire circumference such that tips of the grooves are located on a circumferential reference line. Also, as shown in FIG. 2(b), dynamic-pressure grooves may be formed on the surface of a thrust plate (on the thrust dynamic-pressure gap definition surface). In FIG. 2(b), a plurality of curved grooves are formed on the surface of the thrust plate while being arranged at predetermined intervals in the circumferential direction of the thrust plate, which grooves are curved such that the distance between the center of the thrust plate and a point on each groove reduces gradually toward the inner end of the groove.

The dynamic-pressure bearing of the present invention can be effectively used with, for example, a spindle for rotating a hard disk of a hard disk drive, a spindle for rotating a disk of peripheral equipment, such as a CD-ROM drive, an MO drive, or a DVD drive, for computer use, and a spindle for rotating a polygon mirror of a polygon scanner for use in a laser printer, a copying machine, or a like machine. A bearing used in a rotational drive unit of such precision equipment is subjected to high-speed rotation at a speed of, for example, 8000 rpm or higher (in some cases, even at a speed of 10000–30000 rpm or higher). Application of the present invention to such a bearing enables stable maintenance of fluid dynamic-pressure generated at high level to thereby effectively yield the effect of reducing vibration or the like. Also, the present invention provides a motor having a bearing in which the above-described ceramic dynamic-pressure bearing is used in a rotation output section. Further, the present invention provides a hard disk drive comprising the above-described motor having a bearing and a hard disk rotationally driven by the motor as well as a polygon scanner comprising the above-described motor having a bearing and a polygon mirror rotationally driven by the motor.

Figure 1:
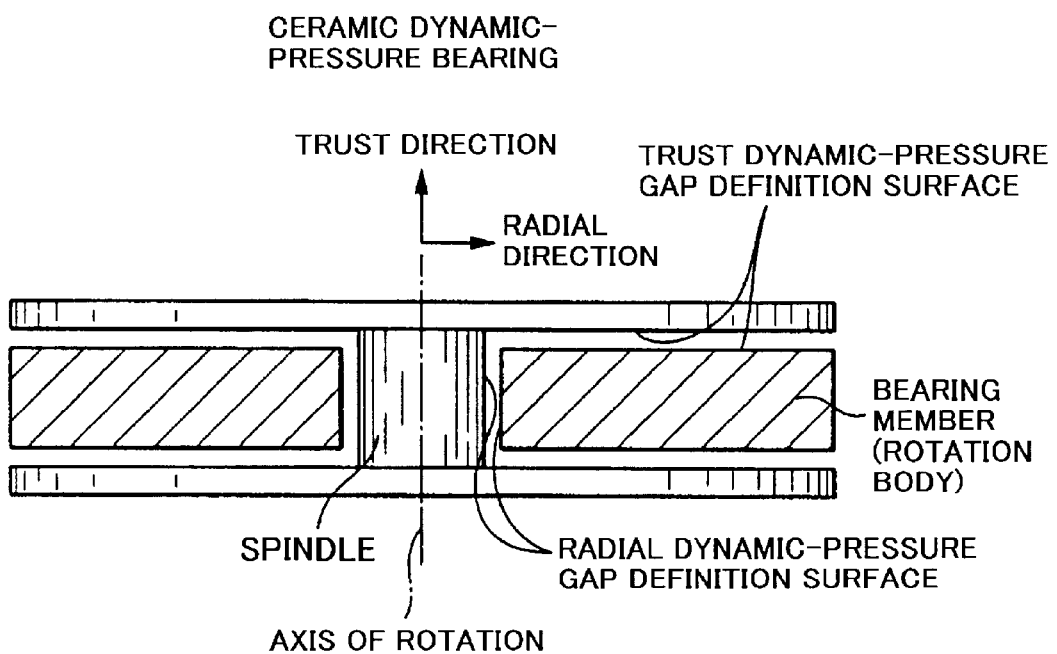
FIG. 1 is a schematic sectional view showing a structural example of a ceramic dynamic-pressure bearing of the present invention.

Reference numerals are used to identify items shown in the drawings as follows:
1, 90: polygon scanner
3, 33, 51, 101, 251: ceramic dynamic-pressure bearing
14, 39, 57, 105, 212: spindle
15, 35, 53, 107, 221: bearing member
17, 38, 91, 240: radial dynamic-pressure gap
18, 92: thrust dynamic-pressure gap
21, 23, 103, 109, 222: thrust plate
M: dynamic-pressure gap definition surface
M1, M2: radial dynamic-pressure gap definition surface
M3–M6: thrust dynamic-pressure gap definition surface

DETAILED DESCRIPTION OF THE PREFERRED EMBODIMENTS

Embodiments of the present invention will next be described with reference to the drawings. However, the present invention should not be construed as being limited thereto.

Figure 3:
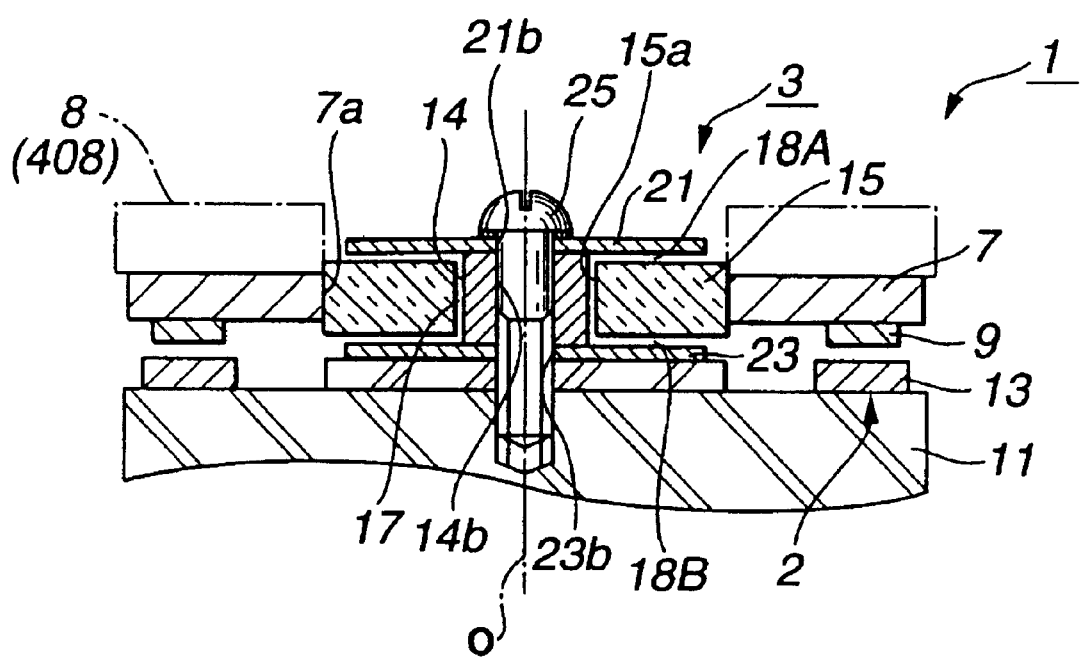
FIG. 3 is a sectional front view showing an example of a polygon scanner motor unit using a ceramic dynamic-pressure bearing of the present invention.

First Embodiment:

A ceramic dynamic-pressure bearing (hereinafter also referred to as a "dynamic-pressure bearing") 3 shown in FIG. 3 is used in, for example, a motor for rotating a polygon mirror 8 in a polygon scanner 1, and uses air as a dynamic-pressure generation fluid. In a motor having a dynamic-pressure bearing 2, in order to rotate a cylindrical bearing member 15 (a rotation body), a permanent magnet 9 is mounted on a support member 7, which is integrally attached to the outer circumferential surface of the bearing member 15, whereas a coil 13 is mounted on a base 11 and faces the permanent magnet 9. The permanent magnet 9 and the coil 13 may be interchanged.

Figure 4A:
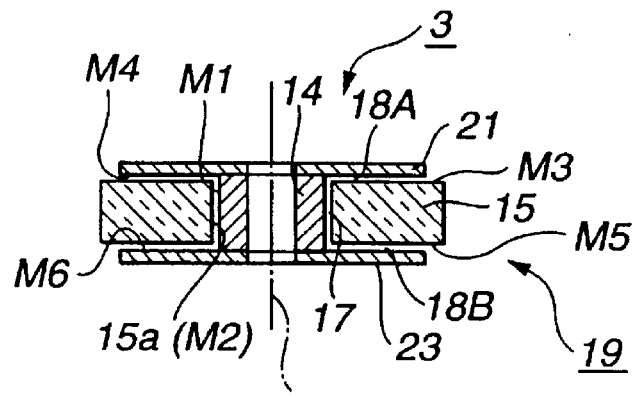
FIGS. 4(a) and 4(b) are a sectional front view and exploded perspective view, respectively, showing the ceramic dynamic-pressure bearing of the motor unit of FIG. 3.

The ceramic dynamic-pressure bearing 3 is configured such that a cylindrical spindle (e.g., inner diameter: 5 mm, outer diameter: 15 mm, axial length: 8 mm) 14 is rotatably inserted into a reception hole 15a of a cylindrical bearing member (e.g., inner diameter: 15 mm, outer diameter: 25 mm, axial length: 8 mm) 15. As shown in FIG. 4(a), an inner circumferential surface M2 of the reception hole 15a and an outer circumferential surface M1 of the spindle 14 serve as radial dynamic-pressure gap definition surfaces. A radial dynamic-pressure gap 17 filled with air is formed between the inner circumferential surface M2 and the outer circumferential surface M1 so as to generate dynamic pressure that is effective in the radial direction relative to an axis of rotation O. The radial dynamic-pressure gap 17 has a size of, for example, about 5 $\mu$m. When viewed from the standpoint of the radial dynamic-pressure gap 17, the spindle 14 is the first member, and the bearing member 15 is the second member.

Disk-like thrust plates (e.g., inner diameter: 5 mm, outer diameter: 25 mm, thickness: 2 mm) 21 and 23 are coaxially attached to the corresponding opposite end faces of the spindle 14 and sandwich a radial bearing unit 19 constituted by the spindle 14 and the bearing member 15, from upper and lower sides thereof. Inner plate faces M4 and M6 of the thrust plates 21 and 23 face opposite end faces M3 and M5 of the bearing member 15 serving as a rotation body. As shown in FIG. 3, the thrust plates 21 and 23 are placed on the corresponding end faces of the spindle 14 such that center holes 21b and 23b of the thrust plates 21 and 23 are aligned with a center hole 14b of the spindle 14. A bolt 25 is inserted into the center hole 14b and is screwed into the base 11 to thereby fix the thrust plates 21 and 23 on the end faces of the spindle 14. However, the form of fixation is not limited thereto.

As shown in FIG. 4(a), the plate faces M4 and M6 of the thrust plates 21 and 23 and the opposite end faces M3 and M5 of the bearing member 15 serve as the thrust dynamic-pressure gap definition surfaces, and thrust dynamic-pressure gaps 18A, B filled with air are formed therebetween so as to generate dynamic pressure that is effective in the direction of the axis of rotation O; i.e., in the thrust direction. Each of the thrust dynamic-pressure gaps 18A, B has a size of, for example, about 6 $\mu$m. When viewed from the standpoint of the thrust dynamic-pressure gaps 18A, B, the thrust plates 21 and 23 are the first members, and the bearing member 15 is the second member. In the present embodiment, the spindle 14, the bearing member 15, and the thrust plates 21 and 23 are entirely formed of alumina ceramic. However, one or more or all of these components may also be formed of electrically conductive ceramic.

Figure 5:
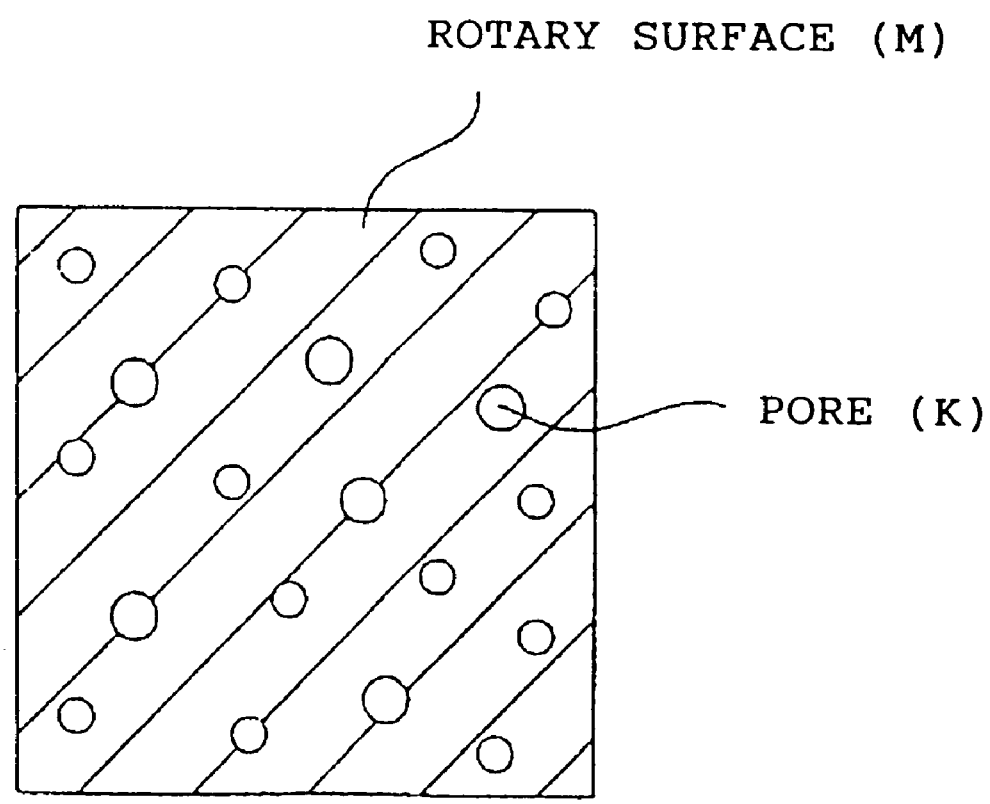
FIG. 5 is an explanatory view schematically showing a state of a rotary surface M having pores K in an enlarged manner.

In the present embodiment, as shown in FIG. 5, a large number of pores K are formed on each of rotary surfaces M such that the surface porosity falls in the range of 10 to 60%.

Figure 4B:
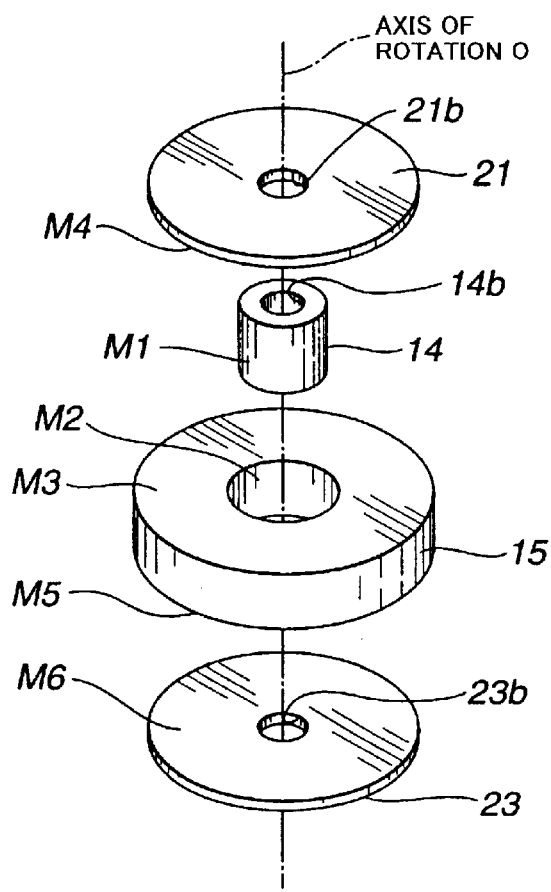

That is, each of the rotary surfaces M shown in FIG. 4(b) has a surface porosity falling in the range of 10 to 60%: a rotary surface (inner-sleeve radial rotary surface) M1 formed on the outer side of the spindle 14 along the axial direction thereof; a rotary surface (outer-sleeve radial rotary surface) M2 formed on the inner side of the bearing member 15 to face the inner-sleeve radial rotary surface M1; a rotary surface (outer-sleeve upper-thrust rotary surface) M3 formed on the upper end of the bearing member 15; a rotary surface (upper-thrust-plate thrust rotary surface) M4 formed on the lower side of the upper thrust plate 21 to face the outer-sleeve upper thrust rotary surface M3; a rotary surface (outer-sleeve lower thrust rotary surface) MS formed on the lower end of the bearing member 15; and a rotary surface (lower-thrust-plate thrust rotary surface) M6 formed on the upper side of the lower thrust plate 23 to face the outer-sleeve lower thrust rotary surface MS.

Figure 2A:
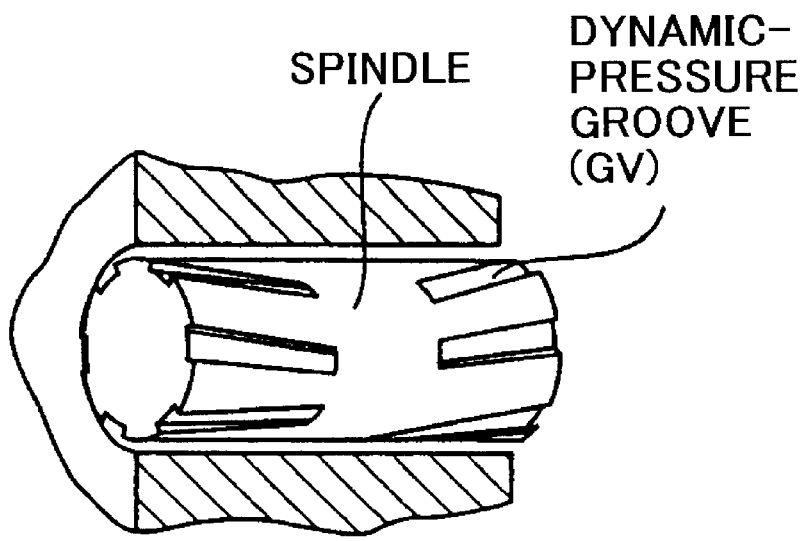
FIGS. 2(a) and 2(b) are explanatory views showing an example of dynamic-pressure grooves formed on a radial dynamic-pressure gap definition surface and an example of dynamic-pressure grooves formed on a thrust dynamic-pressure gap definition surface, respectively.

In order to enable smooth rotation of the bearing member 15 without contact with the spindle 14, well-known dynamic-pressure grooves (see FIG. 2(a)) are formed on the rotary surfaces M of at least one of the bearing member 15 and the spindle 14 (e.g., only on the rotary surfaces M of the spindle 14). Further, in order to enable smooth rotation of the bearing member 15 without contact with the thrust plates 21 and 23, well-known dynamic-pressure grooves (see FIG. 2(b)) are formed on at least one of the end surface of the thrust plate 21 (23) and the corresponding end surface of the bearing member 15 facing thereto (e.g., only on the end surfaces of the thrust plates 21 and 23).

The dynamic-pressure gap definition surfaces are preferably coated with a film which is thinner than a mean dimension (an average of opening diameters) of the pores. Preferably, the film is an amorphous carbon which is mainly made of hard carbon. The advantages of such a coating are as follows:

Even if the dynamic-pressure gap definition surfaces contact each other at low rotation (such as during starting and shutdown) when the dynamic pressure is likely to become low, the amorphous hard carbon film helps prevent wear and adhesion.

Furthermore, designing the film thinner than the mean dimension of the pores prevents the surface pores from becoming excessively clogged, which pores are formed for keeping the fluid dynamic pressure at high level, as described above.

The method of forming a hard carbon film disclosed in Japanese Patent Examined Publication No. Heisei 6(1994)-060404 (equivalent of JP62116767 and JP1940883C) can be used. For depositing the hard carbon film without excessively clogging the pores (which pores contribute to keeping fluid dynamic pressure at a high level), however, the following method is more effective:

Allowing a material stream containing carbon to flow over and accumulate on the dynamic-pressure gap distinction surface in such a manner as to form an inclined incident angle relative to a surface of a member by a known CVD method.

The above-described dynamic-pressure bearing 3 can be fabricated in the following manner.

For each of the ceramic members; i.e., the spindle 14, the bearing member 15, and the thrust plates 21 and 23, ceramic powder of alumina is press-formed into a green compact, which is to serve as the corresponding member; the green compact is sintered; and the sintered product is polished to have predetermined dimensions. Subsequently, dynamic-pressure grooves are formed on the rotary surface M. The dynamic-pressure grooves are formed, for example, by sand-blasting or etching. The thus-obtained dynamic-pressure bearing 3 is built into the motor unit 1.

In the above-described manufacturing method, adjustment of surface porosity is effected by changes in firing temperature and polishing conditions.

As described above, in the present embodiment, since the surface porosity of each rotary surface M falls within the range of 10 to 60%, vibration during rotation decreases, and the ceramic members such as the outer bearing member 15 and the thrust plates 21 and 23 are not prone to break. In addition, occurrence of linking and seize-up at the time of starting and stopping can be prevented, also contributing to prevent breakage of the ceramic members such as the bearing member 15 and the thrust plates 21 and 23. Moreover, even when one of the paired components is formed of a metal, the member formed of the metal is not prone to cause seize-up.

In the present embodiment, the surface porosities of all (6) of the rotary surfaces M fall within the range of 10 to 60%, and this is most preferred. However, the effect can be obtained to some degree even when a smaller number (e.g., 1 to 5) of the rotary surfaces M have a surface porosity falling within the range of 10 to 60%. For example, a desirable effect can be obtained when one of the radial rotary surfaces M1 and M2, one of the thrust rotary surfaces M3 and M4, and one of the thrust rotary surfaces M5 and M6 satisfy the requirement of surface porosity.

Next, a test example is described which was performed to confirm the effect of the present embodiment.

A large number of dynamic-pressure bearings were manufactured in accordance with the above-described manufacturing method; the surface porosity of each sample was measured in accordance with the method described in (1) below; and the experiment described in (2) below was performed for samples having different surface porosities. The results are shown in Table 1 below.

(1) Method (and Equipment) for Measuring Surface Porosity

The image of a mirror-polished surface (surface corresponding to a radial rotary surface or thrust rotary surface of a dynamic-pressure bearing) of a workpiece to be measured was captured using a CCD camera. The thus obtained image data were fed to an image processor, which performed processing for recognizing pores within the field of view. Subsequently, the ratio (surface porosity) of the total area of pores to the area of the field of view was calculated.

(2) Experimental Method

Each dynamic-pressure bearing was built into a motor unit, and the runout of a rotation portion (annular member) (the amount of deflection from a rotary surface perpendicular to the center of the shaft) was measured using a laser micrometer.

TABLE 1

| No. | Surface porosity (%) | Result of measurement | Evaluation |
|-----|----------------------|-----------------------|------------|
| Examples | | | |
| 1 | 10 | Runout: less than 0.1 μm Possibility of linking | ○ |
| 2 | 20 | Runout: less than 0.1 μm | ◉ |
| 3 | 30 | Runout: less than 0.1 μm | ◉ |
| 4 | 40 | Runout: less than 0.1 μm | ◉ |

TABLE 1-continued

| No. | Surface porosity (%) | Result of measurement | Evaluation |
|---|---|---|---|
| 5 | 50 | Runout: less than 0.1 μm | ⊚ |
| 6 | 60 | Runout: 0.1 μm to 0.2 μm (0.2 μm being excluded) | ○ |
| Comparative Examples | | | |
| 7 | 8 | Runout: 0.1 μm to 0.2 μm Linking occurred | X |
| 8 | 62 | Runout: less than 0.3 μm | X |
| 9 | 70 | Runout: less than 0.5 μm | X |
| 10 | 80 | Runout: less than 0.5 μm | X |

○-good; ⊚-very good; X-bad

As can be seen from Table 1, Sample Nos. 1 to 6 of the present invention which have surface porosities falling within the range of 10 to 60% are preferred, because runout is less than 0.1 μm and no linking occurs (Sample Nos. 1 to 5), or because no linking occurs although runout is 0.1 to 0.2 μm (Sample No. 6). Sample Nos. 2 to 5 whose surface porosities fall within the range of 20 to 50% are particularly preferred, because there is no possibility of linking occurring, and runout is less than 0.1.

Here, the phrase "possibility of linking occurring" means that the torque at the time of starting rotation becomes greater than an ordinary level.

By contrast, Comparative Sample Nos. 7 to 10 are not preferred, because seize-up occurs although runout is less than 0.1 μm (Comparative Sample No. 7), or because runout is in excess of 0.1 μm (Comparative Samples Nos. 8 to 10).

(3) Moreover, three rotary surfaces having different surface porosities were photographed using a metal microscope in order to confirm changes in the surface state of the rotary surface of the dynamic-pressure bearing caused by changes in surface porosity.

Figure 6A:
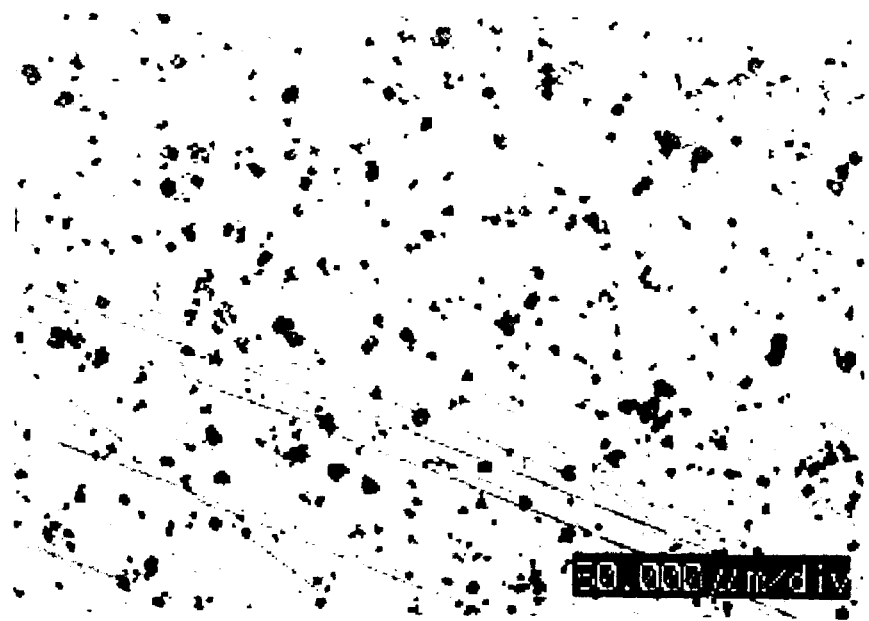
FIGS. 6(a)–6(c) are photographs each showing a state of a rotary surface of a dynamic-pressure bearing.
Figure 6B:
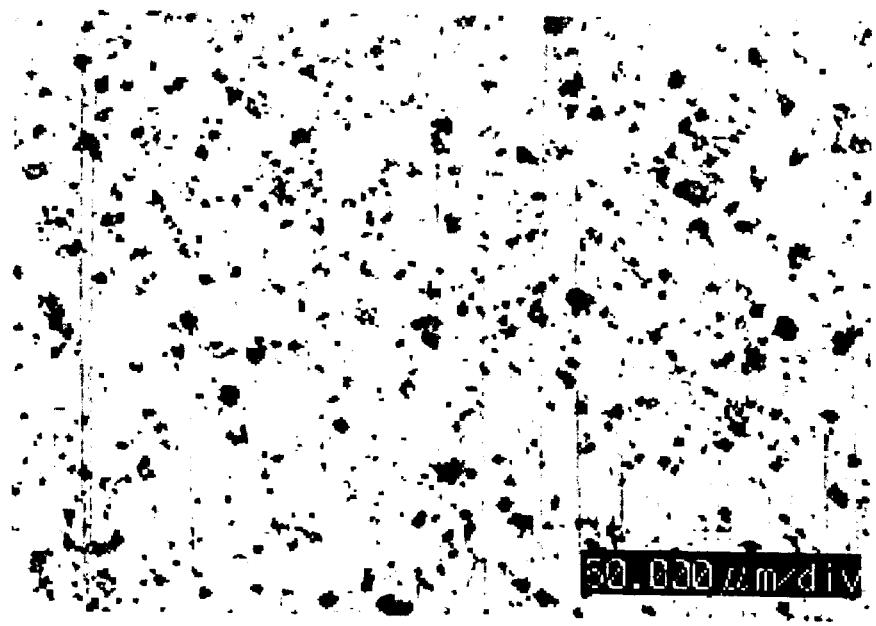
Figure 6C:
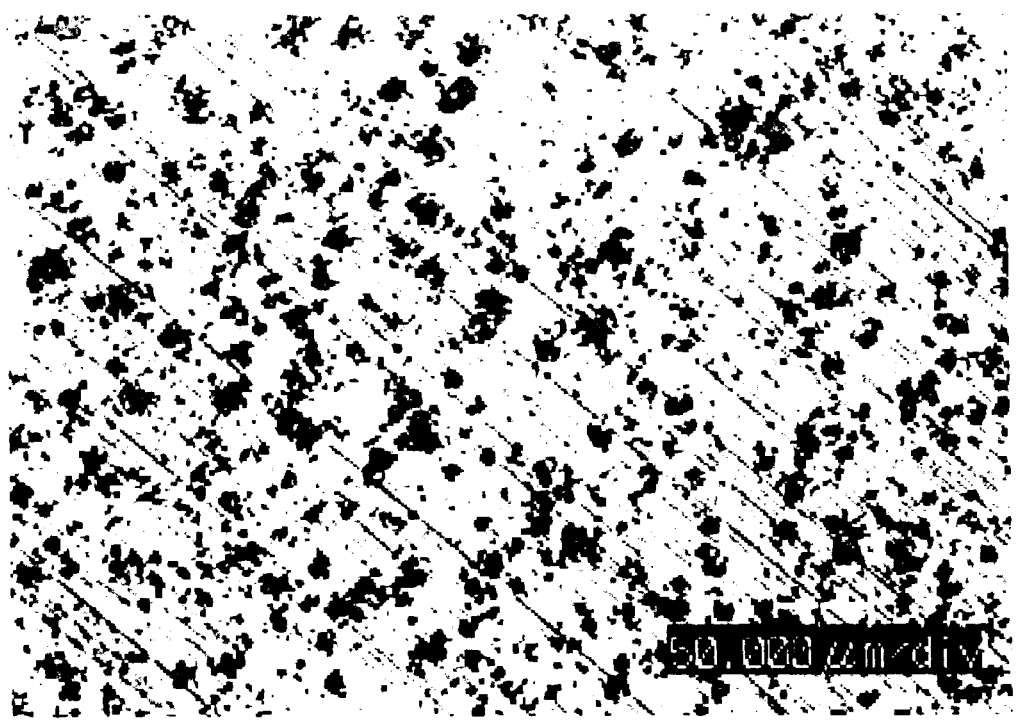

FIGS. 6(a)–6(c) show the thus-obtained photographs. From these photographs, it is understood that the total area of pores (darkened portions in the drawing) increases with the surface porosity of the rotary surface.

Second Embodiment:

Next, a ceramic dynamic-pressure bearing of a second embodiment will be described. However, descriptions of portions similar to those of the first embodiment will be simplified.

The ceramic dynamic-pressure bearing of the present embodiment has a greater axial length as compared with the ceramic dynamic-pressure bearing of the first embodiment, and the inclination of the bearing, which is a rotation body, is restricted by means of a radial rotary surface. The ceramic dynamic-pressure bearing of the present embodiment will now be described in detail.

Figure 11:
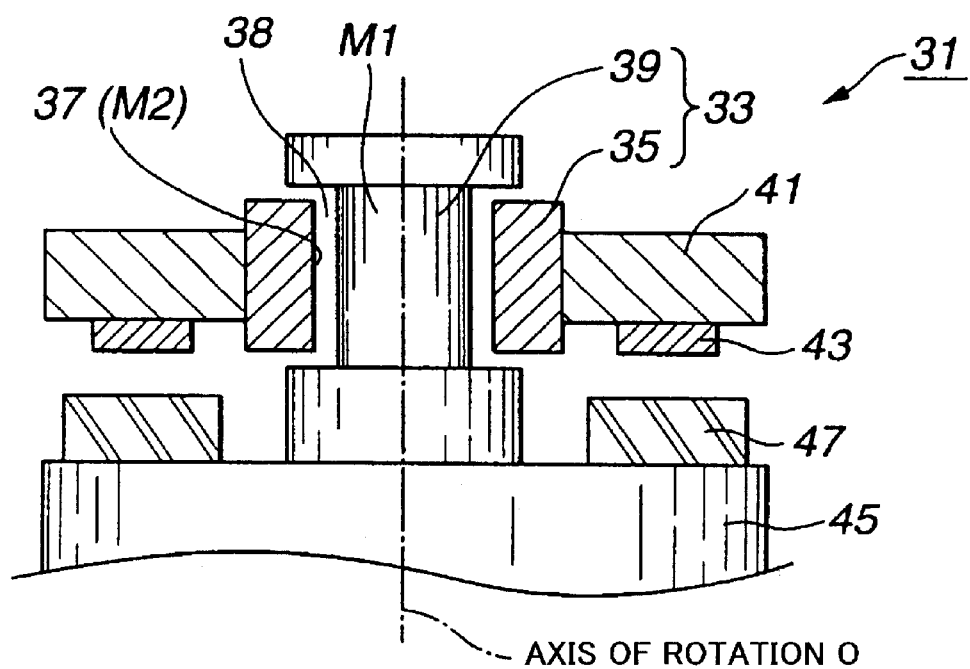
FIG. 11 is a schematic sectional view showing a modified example of a motor unit using a ceramic dynamic-pressure bearing of the present invention.

As shown in FIG. 11, the ceramic dynamic-pressure bearing of the present embodiment is used in a motor unit 31 for rotating a polygon mirror.

The dynamic-pressure bearing 33 of the present embodiment comprises a cylindrical bearing 35 (inner diameter: slightly greater than 13 mm, outer diameter: 25 mm, axial length: 5 mm) and a spindle 39 (diameter: slightly less than 13 mm, length: 8 mm) which is axially inserted into a through-hole 37 of the bearing 35. The spindle 39 is fixed and therefore does not rotate, and the bearing 35 surrounding the spindle 39 rotates. Needless to say, if the inner diameter of the bearing 35 is identical to the diameter of the spindle 39, the bearing 35 cannot rotate. Therefore, the inner diameter of the bearing 35 is rendered slightly greater than 13 mm, and the diameter of the spindle 39 is rendered slightly less than 13 mm, so that a slight clearance is formed between the bearing 35 and the spindle 39.

The bearing 35 and the spindle 39 are formed of alumina ceramic, and respective rotary surfaces M; i.e., a rotary surface (outer-side radial rotary surface) M1 located on the outer side of the spindle 39 and a rotary surface (inner-side radial rotary surface) M2 located on the inner side of the bearing 35 have surface porosities which fall within the range of 10 to 60%.

In the ceramic dynamic-pressure bearing 33 of the present embodiment, in order to rotate the bearing 35, a permanent magnet 43 is disposed on the lower surface of an annular member 41 attached to the periphery of the bearing 35, and an electromagnet 47 is disposed on a base 45, which faces the permanent magnet 43.

In the present embodiment as well, dynamic-pressure grooves as shown in FIG. 2(a) are formed on the rotary surface M of at least one of the bearing 35 and the spindle 39 (e.g., only on the rotary surface (outer-side radial rotary surface) M1 located on the outer side of the spindle 39).

In the ceramic dynamic-pressure bearing 33 of the present embodiment having the above-described structure, the surface porosity of the rotary surface M falls within the prescribed range of 10 to 60%. Therefore, vibration occurring upon rotation of the dynamic-pressure bearing 33 is very small. Further, no linking occurs at the time of starting or stopping. Moreover, even when one of the components (the bearing 35 or the spindle 39) is formed of a metal such as stainless steel, seize-up of the metal component does not occur.

Third Embodiment:

Next, a ceramic dynamic-pressure bearing of a third embodiment will be described.

Figure 7:
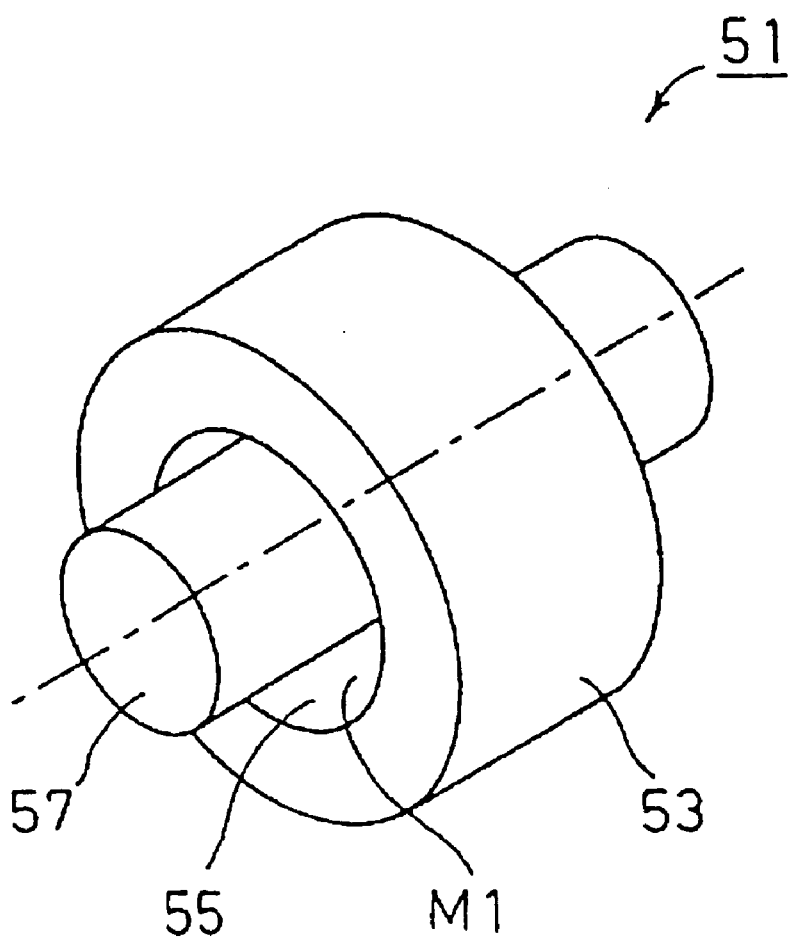
FIG. 7 is a perspective view of a dynamic-pressure bearing of yet another embodiment of the invention.

As shown in FIG. 7, a ceramic dynamic-pressure bearing 51 of the present embodiment comprises a cylindrical bearing 53 and a spindle 57 which is axially inserted into a through-hole 55 of the bearing 53.

In the present embodiment, the bearing 53 is fixed and therefore does not rotate, and the spindle 57 rotates. The spindle 57 is disposed eccentrically within the through-hole 55 such that the center axis of the spindle 57 is slightly shifted from the center axis of the through-hole 55. Therefore, in accordance with the principle of the dynamic-pressure bearing, the spindle 57 rotates at high speed while maintaining a gap between the spindle 57 and the bearing 53.

Notably, well-known dynamic-pressure grooves as shown in FIG. 2(a) are formed on the rotary surface of at least one of the spindle 57 and the bearing 53.

The spindle 57 is formed of stainless steel (SUS 304), the bearing 53 is formed of alumina ceramic, and the inner-side radial rotary surface M1, which is the inner surface of the bearing 53, has a surface porosity which falls within the range of 10 to 60%.

As in the above-described first and second embodiments, occurrence of vibration, occurrence of linking, and occurrence of seize-up can be prevented by employing the structure of the present embodiment.

In the present embodiment, the spindle 57 is formed of metal, and the bearing 53 is formed of ceramic. However, the spindle 57 may be formed of ceramic, and the bearing 53 may be formed of metal. Alternatively, both the spindle 57 and the bearing 53 may be formed of ceramic.

Effect of the First Through Third Embodiments:

As described above, in the ceramic dynamic-pressure bearing of the first through third embodiments, since the surface porosity of a ceramic rotary surface falls within the range of 10 to 60%, smooth rotation is realized, while vibration of the dynamic-pressure bearing during rotation is prevented. Further, even when one of the components of the dynamic-pressure bearing is formed of a metal, occurrence of seize-up is prevented. Moreover, the occurrence of linking at the time of starting and stopping can be prevented.

Fourth Embodiment:

In this embodiment, the thrust plates 21 and 23, as shown in FIGS. 3 and 4, are entirely formed of the aforementioned electrically conductive ceramic.

Figure 2B:
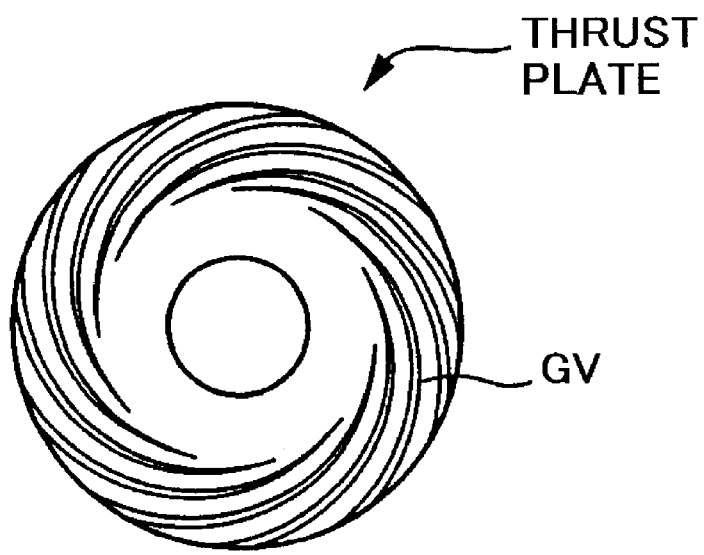
Figure 9:
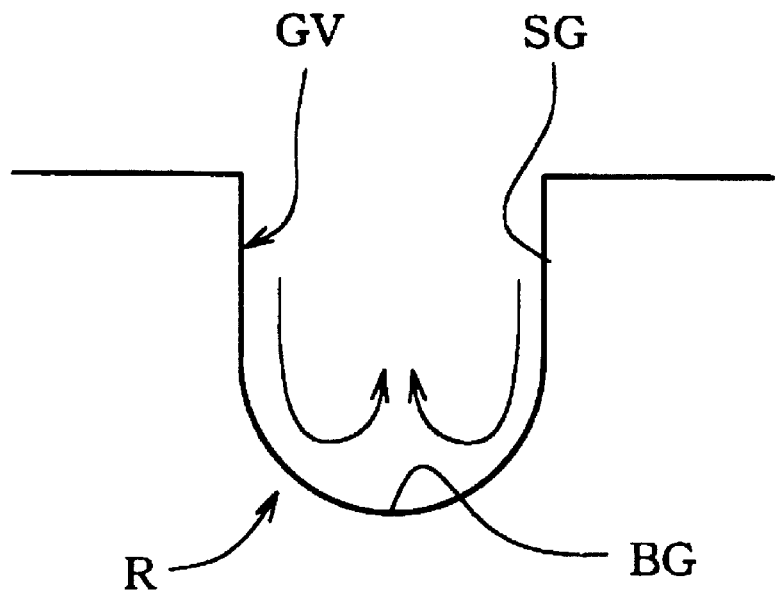
FIG. 9 is a schematic sectional view of a dynamic-pressure groove formed by electrolytic etching.

Furthermore, in order to increase the dynamic pressure that is to be generated, dynamic-pressure grooves as shown in FIG. 2(a) are formed on at least either one of the radial dynamic-pressure gap definition surfaces M1 and M2 (e.g., on the surface M1 of the spindle 14). Also, dynamic-pressure grooves GV as shown in FIG. 2(b) are formed on at least any one of the thrust dynamic-pressure gap definition surfaces M3 to M6 (e.g., on the surfaces M4 and M6 of the thrust plates 21 and 23). As will be described later, the dynamic-pressure grooves GV are formed by electrolytic etching. As shown in FIG. 9, on the cross section of a groove taken perpendicular to the longitudinal direction of the groove, a curvature portion R having a radius of 3–7 $\mu$m is formed at a meeting position where a groove sidewall surface SG and a groove bottom surface BG meet. Average roughness along the centerline as measured on the groove bottom surface BG is not greater than 1.5 $\mu$m. Such a groove profile allows fluid vortexes, which serve as a dynamic-pressure generation source, to turn smoothly along the curvature portions R as represented by arrows in FIG. 9, thereby enhancing dynamic-pressure generation efficiency and thus enabling stable, smooth generation of dynamic pressure.

A method for manufacturing the above-described ceramic dynamic-pressure bearing 3 will next be described.

The electrically conductive ceramic members; i.e., the spindle 14, the bearing member 15, and the thrust plates 21 and 23 can be manufactured in the following manner. A powder of the aforementioned electrically conductive inorganic compound phase, a sintering aid powder, and, as needed, a material powder of the aforementioned ceramic matrix phase are mixed to thereby obtain a forming material powder. The forming material powder is compacted into a green compact by use of a die and press or a like apparatus. The green compact is sintered by a known sintering process. The thus-obtained sintered body is polished at a required surface including a surface which is to become the dynamic-pressure gap definition surface so as to have predetermined dimensions.

In the above-described manufacturing method, adjustment of surface porosity may likewise be effected by changes in firing temperature and polishing conditions.

In the fourth embodiment, the surface porosity of one or more of the rotary surfaces M may also be adjusted to fall within the range of 10 to 60%, such that vibration during rotation may further decrease, and such that the ceramic members such as the bearing member 15 and the thrust plates 21 and 23 are not prone to break. In addition, occurrence of linking and seize-up at the time of starting and stopping can be prevented, also contributing to prevent breakage of the ceramic members such as the bearing member 15 and the thrust plates 21 and 23.

Figure 8A:
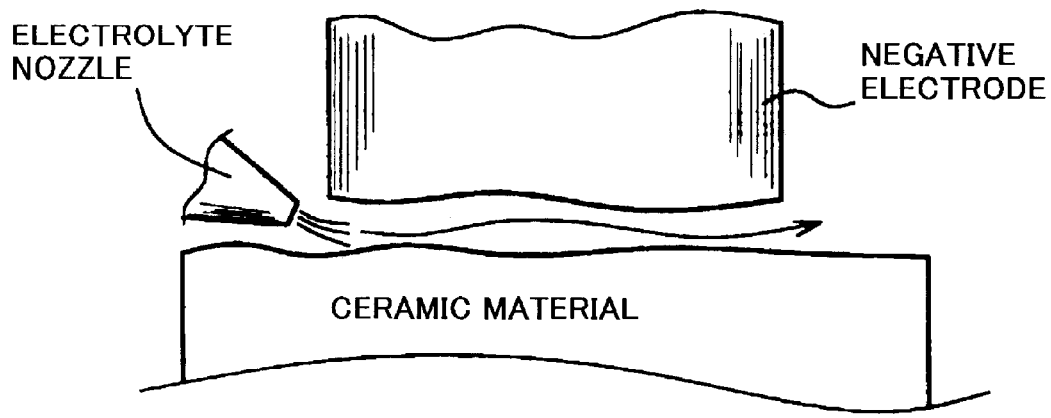
FIGS. 8(a) and 8(b) are views illustrating an example process for forming a dynamic-pressure groove by electrolytic etching.
Figure 8B:
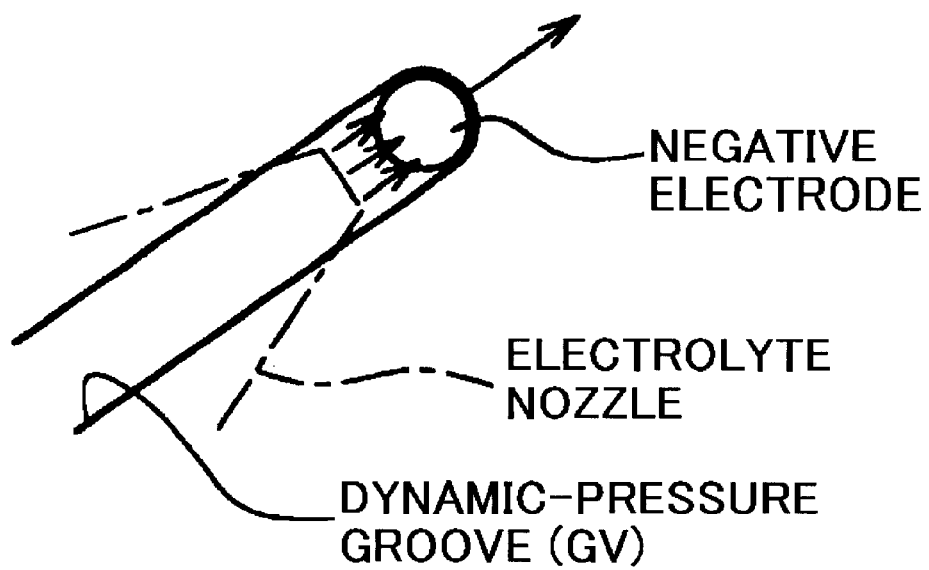

Dynamic-pressure grooves GV are engraved on a polished dynamic-pressure gap definition surface by electrolytic etching. As shown in FIG. 8(a), an electrode whose end face dimension corresponds to the width of a groove to be formed is disposed so as to face a dynamic-pressure gap definition surface which is formed of ceramic and to which voltage is applied so as to impart positive polarity thereto, while a predetermined gap is maintained therebetween. An electrolyte is discharged into the gap from an electrolyte nozzle. The electrode and the electrolyte nozzle are moved along a pattern of a groove to be formed, while the required voltage is being applied. As a result, as shown in FIG. 8(b), a dynamic-pressure groove of a desired pattern can be formed on the dynamic-pressure gap definition surface.

Figure 14A:
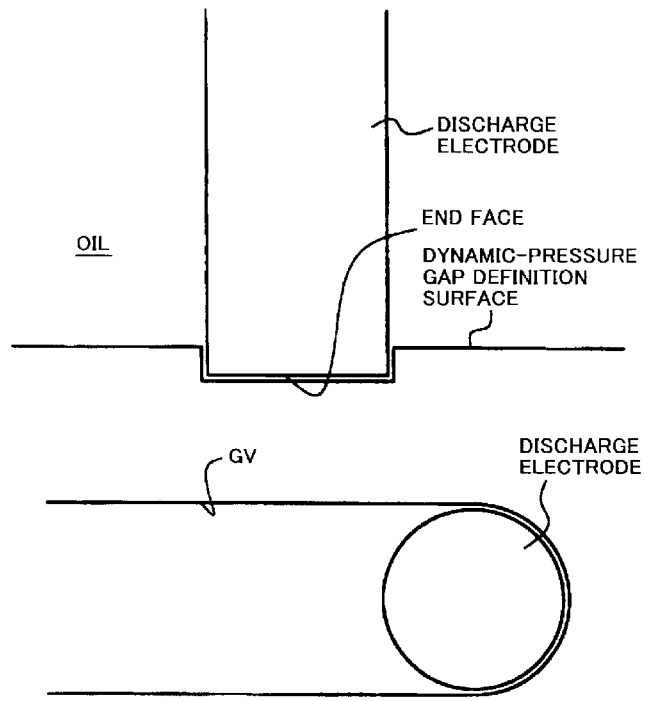
FIGS. 14(a) and 14(b) are views illustrating an example process for forming a dynamic-pressure groove by electric discharge machining.
Figure 14B:
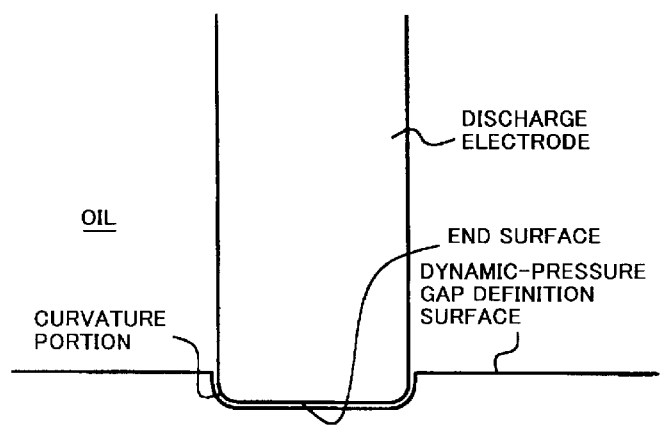

In FIG. 8, a dynamic-pressure groove GV can be engraved by electric discharge machining in place of electrolytic etching. In this case, as shown in FIG. 14(a), the sintered body is immersed in oil; in place of the electrolyte nozzle, a discharge electrode is disposed such that its end face faces a dynamic-pressure gap definition surface; and high voltage is applied between the discharge electrode and the dynamic-pressure gap definition surface. While this state is maintained, the electrode is moved along a pattern of a groove to be formed, whereby a dynamic-pressure groove GV can be formed on the dynamic-pressure gap definition surface. Notably, in FIG. 14(a), the peripheral edge of the end face of the discharge electrode is relatively sharp, and therefore a curvature portion of the aforementioned size may not be formed on the bottom of a dynamic-pressure groove GV. By contrast, as shown in FIG. 14(b), when the peripheral edge of the end face of the discharge electrode is radiused to form a curvature portion, a corresponding curvature portion can be formed at the bottom of a dynamic-pressure groove.

Figure 10:
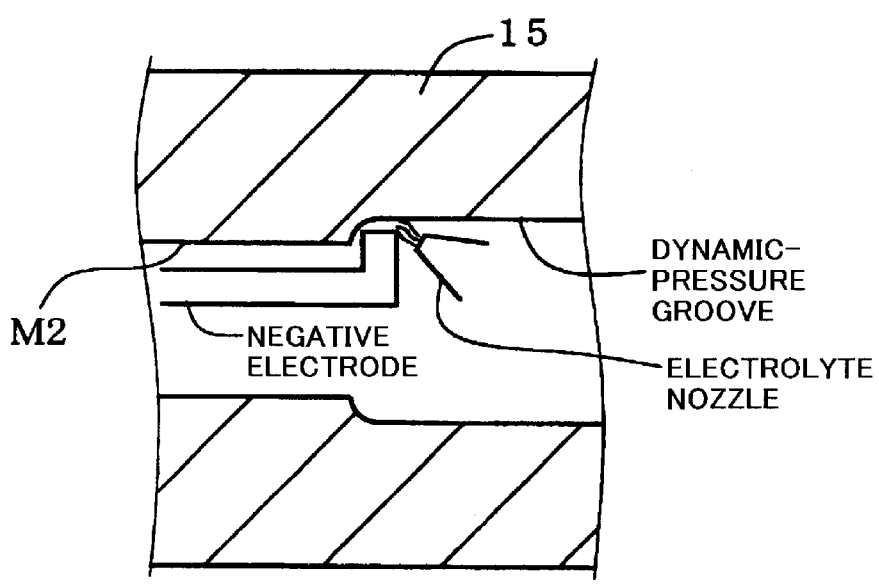
FIG. 10 is a view illustrating an example process for forming dynamic-pressure grooves on the inner circumferential surface of a bearing member by electrolytic etching.

As shown in FIG. 10, even in the case of the radial dynamic-pressure gap definition surface M2, which is the inner circumferential surface of the bearing member 15 and which encounters difficulty in engraving dynamic-pressure grooves by shotblasting, when the end face of an inserted negative electrode is positioned to face the radial dynamic-pressure gap definition surface M2, dynamic-pressure grooves can be easily formed by electrolytic etching.

Dynamic-pressure grooves are formed, as described above, on the spindle 14, the bearing member 15, or the thrust plates 21 and 23. Then, as shown in FIG. 3, the support member (herein, formed into a disk-like shape having a hole portion 7a into which the bearing member 15 is fitted) 7, the permanent magnet 9, and the coil 13 are mounted through bonding or a like process. Further, the spindle 14, the bearing member 15, and the thrust plates 21 and 23 are assembled by use of the bolt 25, thereby yielding a motor having a dynamic-pressure bearing. Attachment of the polygon mirror 8 onto the support member 7 completes assembly of the polygon scanner 1.

The polygon scanner 1 operates in the following manner. The motor having a dynamic-pressure bearing 2 is configured as an alternating-current induction motor. When electricity is applied to the coil 13, the polygon mirror 8, the bearing member 15, and the support member 7 are rotated unitarily, whereas the spindle 14 serves as a fixed spindle. The polygon mirror 8 is rotated at a maximum rotational speed of 8000 rpm or higher or at a maximum rotational speed of 10000 rpm or higher or even 30000 rpm or higher (e.g., about 50000 rpm) when higher scanning speeds are required. Accordingly, the number of turns of the coil 13, the intensity of an external magnetic field to be generated for excitation use by the permanent magnet 9, rated drive voltage, etc., are determined as appropriate so as to realize the above-mentioned maximum rotational speed, with the load of rotation of the polygon mirror 8 taken into account. Radial dynamic-pressure, which is effective in the radial direction relative to the axis of rotation O, is generated in the radial dynamic-pressure gap 17 formed between the spindle 14 and the bearing member 15, whereas thrust dynamic-pressure is generated in the thrust dynamic-pressure gaps 18A, B formed between the thrust plates 21 and 23 and the bearing member 15. Thus, the axis of rotation of the polygon mirror 8 is supported in the radial and thrust directions while the members that undergo relative rotation are maintained in a non-contacting state.

Next, FIG. 11 shows another example of a motor to be used in a polygon scanner (illustration of a polygon mirror is omitted). The motor 31 includes a ceramic dynamic-pressure bearing 33 of the present invention, which bearing 33 is configured in a manner similar to that shown in FIG. 3. The ceramic dynamic-pressure bearing 33 includes a cylindrical bearing member 35 (e.g., inner diameter: slightly greater than 13 mm, outer diameter: 25 mm, axial length: 5 mm) and a spindle 39 (diameter: slightly less than 13 mm, length: 8 mm) which is axially inserted into a reception hole 37 of the bearing member 35. The spindle 39 is fixed and therefore does not rotate; i.e., the bearing member 35, which surrounds the spindle 39, rotates. The inner circumferential surface of the bearing member 35 and the outer circumferential surface of the spindle 39 serve as radial dynamic-pressure gap definition surfaces M2 and M1, respectively. A radial dynamic-pressure gap 38 is formed between the surfaces M2 and M1. In the ceramic dynamic-pressure bearing 33 of FIG. 11, the bearing member 35 and the spindle 39 are greater in axial dimension than those of the ceramic dynamic-pressure bearing 3 of FIG. 3; thus, radial dynamic-pressure serves as a main source of a force for supporting the axis of rotation O. Therefore, the thrust plates are omitted.

As in the case of the ceramic dynamic-pressure bearing 3 of FIG. 3, a permanent magnet 43 is disposed on an annular support member 41, which is unitarily attached to the outer circumferential surface of the bearing member 35. A coil 47 is mounted on a base 45 in such a manner as to face the permanent magnet 43. Dynamic-pressure grooves as shown in FIG. 2(*a*) are formed on the dynamic-pressure gap definition surfaces M1 and M2 of at least either one of the bearing member 35 and the spindle 39; for example, on the outer dynamic-pressure gap definition surface (outer radial dynamic-pressure gap definition surface) M1 of the spindle 39.

Figure 12:
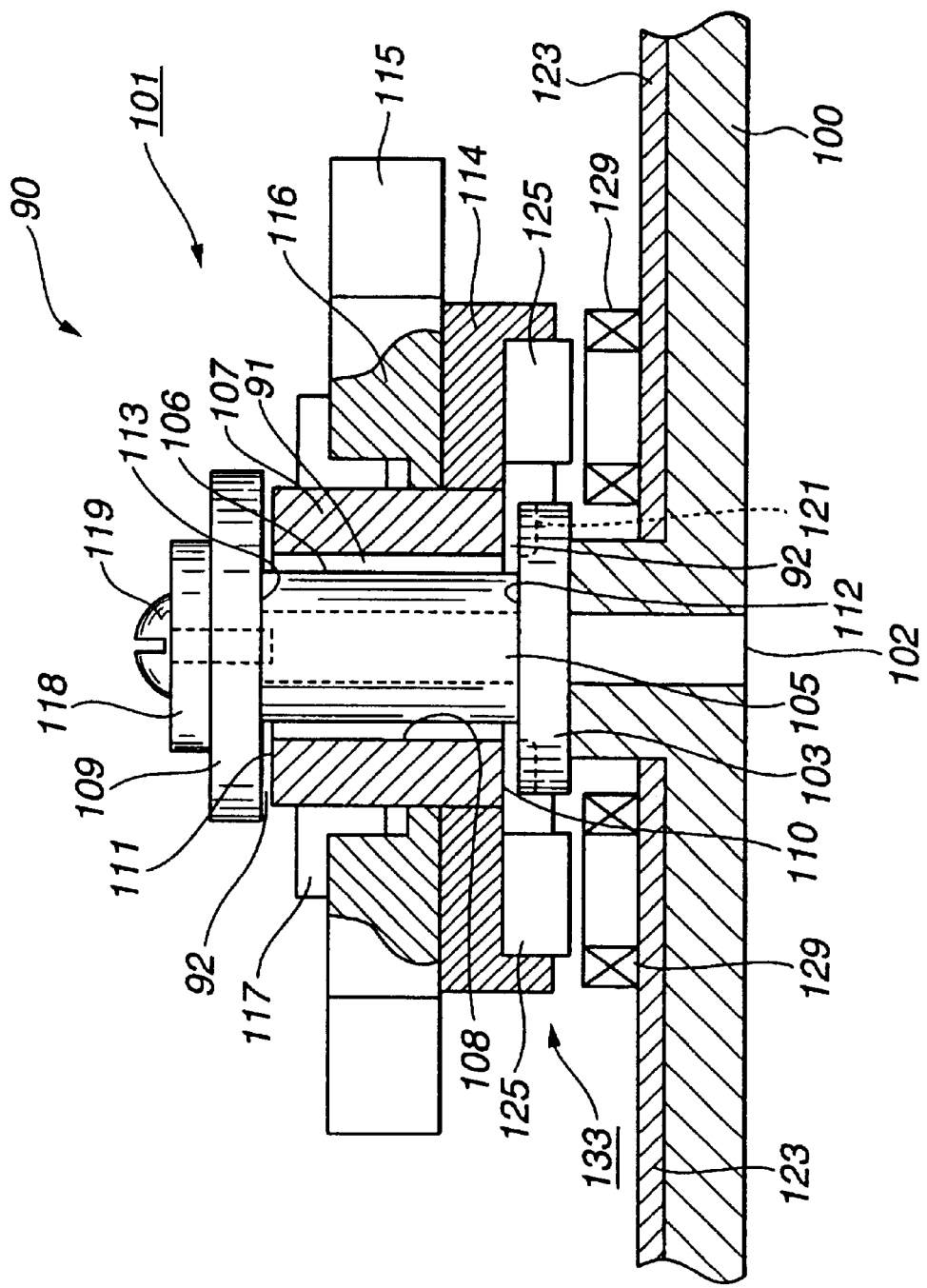
FIG. 12 is a sectional front view showing an example of a polygon scanner using a ceramic dynamic-pressure bearing of the present invention.

FIG. 12 shows a specific configuration example of a polygon scanner. In a polygon scanner 90, a core rod 102 for fixedly supporting a ceramic dynamic-pressure bearing 101 of the present invention is fixed at one end thereof on a base 100 in a vertically standing condition. A lower thrust plate 103 made of ceramic is fixedly attached to the core rod 102. A spindle 105 made of ceramic is fixedly attached to the core rod 102 such that the core rod 102 extends through the spindle 105. A bearing member 107 made of ceramic is rotatably disposed such that a radial dynamic-pressure gap 91 (1–7 μm) is formed between the cylindrical outer surface of the spindle 105 serving as a radial dynamic-pressure gap definition surface 106 and the inner circumferential surface of the bearing member 107 serving as a radial dynamic-pressure gap definition surface 108. An upper thrust plate 109 made of ceramic is fixedly attached to the core rod 102 such that the core rod 102 extends through the upper thrust plate 109. Thrust dynamic-pressure gaps 92 are formed respectively between the upper end face of the bearing member 107 serving as a thrust dynamic-pressure gap definition surface 111 and a thrust dynamic-pressure gap definition surface 113 of the upper thrust plate 109 and between the lower end face of the bearing member 107 serving as a thrust dynamic-pressure gap definition surface 110 and a thrust dynamic-pressure gap definition surface 112 of the lower thrust plate 103. The ceramic members are also formed of electrically conductive ceramic and are basically similar to those of the ceramic dynamic-pressure bearings 3 and 33 of FIGS. 3 and 10.

A discrete support member 114 is fixedly attached to the outer circumferential surface of the bearing member 107, and a polygon mirror 116 having a number of reflecting surfaces 115 is fixed on the support member 114 by use of a fixture member 117 (the rotation body and the support member 114 may be integrally formed). The other end of the core rod 102 is fixed by a retainer plate 118 and a bolt 119. Further, dynamic-pressure grooves 121 similar to those shown in FIG. 2(*b*) are formed on the thrust dynamic-pressure gap definition surface 112 of the lower thrust plate 103. Also, dynamic-pressure grooves (not illustrated) similar to those shown in FIG. 2(*a*) are formed on the outer circumferential surface (hereinafter also referred to as the "outer circumferential surface 106") of the spindle 105 serving as the radial dynamic-pressure gap definition surface 106.

A winding 129 is disposed on the base 100 via an insulating member 123, and a magnet 125 is disposed on a bottom portion of the support member 114 of the bearing member 107 so as to face the winding 129, whereby a three-phase brushless motor 133 is configured. The three-phase brushless motor 133 functions as a drive motor for the bearing member 107 such that, when electricity is applied to the winding 129, the bearing member 107 is inductively rotated at high speed. Rotation of the three-phase brushless motor 133 causes generation of dynamic pressure in the radial dynamic-pressure gap 91 to thereby enable smooth high-speed rotation.

When the bearing member 107 is not rotating, the lower end face 110 of the bearing member 107 and the thrust dynamic-pressure gap definition surface 112 of the lower thrust plate 103 are in contact with each other. When the bearing member 107 starts rotating about the spindle 105, thrust dynamic-pressure is generated in the thrust dynamic-pressure gap 92, thereby changing the contacting state to a non-contacting state and thus enabling high-speed rotation.

Figure 13:
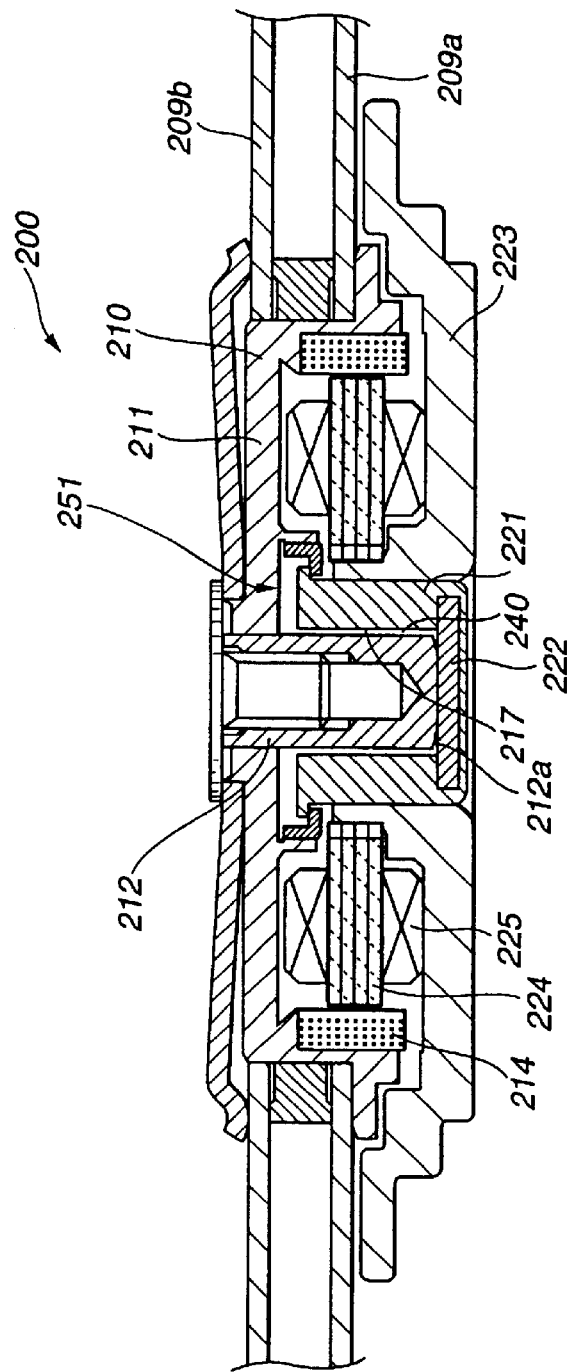
FIG. 13 is a sectional front view showing an example of a hard disk drive using a ceramic dynamic-pressure bearing of the present invention.

FIG. 13 shows an example in which the present invention is applied to a hard disk drive. The hard disk drive 200 is configured such that magnetic disks 209*a* and 209*b* are fixed on the outer circumferential surface of a hub 211, and a motor rotary-spindle 212 is fixedly attached to the hub 211 at the center of the hub 211. The hub 211 rotates together with the disks 209*a* and 209*b* fixed thereto. The motor rotary-spindle 212 is supported in the radial direction by a fixed bearing member 221 formed of electrically conductive ceramic and is supported in the thrust direction by a thrust plate 222 formed of electrically conductive ceramic.

Since the motor rotary-spindle 212, the fixed bearing member 221, and the thrust plate 222 are formed of a ceramic material, the motor rotary-spindle 212 and the fixed bearing member 221 have mechanical rigidity capable of enduring a load of the disks 209*a* and 209*b* rotating at high speed and high-speed rotation.

The gap formed between the motor rotary-spindle 212 and the fixed bearing member 221 and the gap formed between the motor rotary-spindle 212 and the thrust plate 222 are filled with air; a radial dynamic-pressure gap 240 is formed along the circumferential direction between the motor rotary-spindle 212 and the fixed bearing member 221; and unillustrated dynamic-pressure grooves are formed on an inner circumferential surface 217 of the fixed bearing member 221. As the motor rotary-spindle 212 rotates, radial dynamic-pressure is generated in the radial dynamic-pressure gap 240, whereby the motor rotary-spindle 212 rotates in a non-contacting state relative to the fixed bearing member 221. Between the outer circumferential surface of the motor rotary-spindle 212 and the inner circumferential surface of the fixed bearing member 221, which serve as radial dynamic-pressure gap definition surfaces, for example, the outer circumferential surface of the motor rotary-spindle 212 has dynamic-pressure grooves formed thereon as shown in FIG. 2(a). An end 212a of the motor rotary-spindle 212 assumes the form of a spherical pivot such that the thrust plate 222 bears a thrust force of the motor rotary-spindle 212.

In the hard disk drive 200, a stator core 224 is fixed on a bracket 223. A stator coil 225 is wound on the stator core 224. As in the case of the polygon scanner of FIG. 12, a rotational drive force of the motor is generated by means of a rotating magnetic field, which is generated by the stator core 224 excited through application of current to the stator coil 225, and a drive magnet 214, which surrounds the stator core 224 and is magnetized in a multipolar condition. The magnet 214 is fixedly attached to the inner circumferential surface of the hub 211, whereby the magnet 214 and the hub 211 constitute a rotor 210. In the hard disk drive 200, the outer bearing member 221 is fixed, whereas the inner spindle (a rotary spindle) 212 rotates. However, referring to FIG. 3, the polygon mirror 8 may be replaced with a magnetic disk 408, whereby a hard disk drive can be configured such that the bearing member 15 rotates, whereas the spindle 14 is fixed.

The present invention is not limited to the above-described embodiments, and may be practiced in various manners without departing from the scope of the present invention. For example, dynamic-pressure generation fluid may be gas other than air or liquid, such as oil or water.

It should further be apparent to those skilled in the art that various changes in form and detail of the invention as shown and described above may be made. It is intended that such changes be included within the spirit and scope of the claims appended hereto.

This application is based on Japanese Patent Application Nos. Hei 11-293864 filed Oct. 15, 1999 and 2001-121621 filed Apr. 19, 2001, the disclosures of which are incorporated herein by reference in their entirety.

What is claimed is:

1. A ceramic dynamic-pressure bearing comprising a dynamic-pressure gap formed between a first member and a second member, which undergo relative rotation about a predetermined axis of rotation, and the relative rotation of the first member and the second member generates fluid dynamic-pressure in the dynamic-pressure gap, wherein at least a portion of at least either the first member or the second member which includes a dynamic-pressure gap definition surface facing the dynamic-pressure gap is formed of electrically conductive ceramic, and dynamic-pressure grooves are formed on the ceramic dynamic-pressure gap definition surface such that, on a cross section of a dynamic-pressure groove taken perpendicular to a longitudinal direction of the groove, a curvature portion having a radius of 3–7 $\mu$m is formed at a position where a groove sidewall surface and a groove bottom surface meet.

2. The ceramic dynamic-pressure bearing as claimed in claim 1, wherein the groove bottom surface has an average roughness along a centerline of not greater than 1.5 $\mu$m.

3. The ceramic dynamic-pressure bearing as claimed in claim 1, adapted for use as a bearing for a spindle for rotating a hard disk of a hard disk drive.

4. The ceramic dynamic-pressure bearing as claimed in claim 1, adapted for use as a bearing for a spindle for rotating a polygon mirror of a polygon scanner.

5. The ceramic dynamic-pressure bearing as claimed in claim 1, wherein the dynamic-pressure gap definition surface of at least one of the first and second members is formed of electrically conductive ceramic having a surface porosity of 10 to 60%.

6. The ceramic dynamic-pressure bearing as claimed in claim 5, wherein said dynamic-pressure gap definition surface is a radial rotary surface formed in a radial direction relative to the axis of rotation.

7. The ceramic dynamic-pressure bearing as claimed in claim 5, wherein said dynamic-pressure gap definition surface is a thrust rotary surface formed in the thrust direction relative to the axis of rotation.

8. The ceramic dynamic-pressure bearing as claimed in claim 1, wherein at least one of the first and second members are formed of ceramic having a surface porosity of 10 to 60%.

9. The ceramic dynamic-pressure bearing as claimed in claim 1, wherein the dynamic-pressure gap definition surface of at least one of the first and second members is formed of ceramic comprising pores and having a surface porosity of 10 to 60%, and the dynamic-pressure gap definition surface comprising said pores is covered with a film, which film is thinner than a mean dimension of the pores of the dynamic-pressure gap definition surface.

10. The ceramic dynamic-pressure bearing as claimed in claim 9, wherein the film comprises amorphous carbon.

11. A motor having a rotary output member comprising the ceramic dynamic-pressure bearing as claimed in claim 1.

12. A motor having a rotary output member as claimed in claim 11, adapted for use in a drive unit for rotating a hard disk of a hard disk drive.

13. A motor having a rotary output member as claimed in claim 11, adapted for use in a polygon mirror drive unit of a polygon scanner.

14. A motor having a rotary output member as claimed in claim 11, adapted for high-speed rotation at a maximum rotational speed of not less than 8000 rpm.

15. A hard disk drive comprising a hard disk and a motor having a rotary output member and a ceramic dynamic-pressure bearing as claimed in claim 11 for rotating said hard disk.

16. A polygon scanner comprising a polygon mirror and a motor having a rotary output member and a ceramic dynamic-pressure bearing as claimed in claim 13 for rotating said polygon mirror.

17. A method for manufacturing the ceramic dynamic-pressure bearing as claimed in claim 1, which comprises electrolytically etching dynamic-pressure grooves on the dynamic-pressure gap definition surface.

18. A ceramic dynamic-pressure bearing comprising a spindle having a rotary surface and a bearing having a rotary surface, said bearing being fitted on the spindle with a gap formed therebetween, in which, when either the spindle or the bearing serving as a rotation body rotates relative to the other, the rotary surfaces of the spindle and the bearing come into a non-contacting state, characterized in that at least the rotary surface of the spindle and/or the bearing is formed of a ceramic having a surface porosity of 10 to 60%, at least a portion of at least either the spindle and the bearing comprises an electrically conductive ceramic, and dynamic-pressure grooves are formed on the rotary surface of the spindle and/or the bearing comprising an electrically conductive ceramic such that, on a cross section of a dynamic-pressure groove taken perpendicular to a longitudinal direction of the groove, a curvature portion having a radius of 3–7 μm is formed at a position where a groove sidewall surface and a groove bottom surface meet.

19. The ceramic dynamic-pressure bearing as claimed in claim 18, wherein at least the rotary surface of the spindle and/or the bearing is formed of a ceramic having a surface porosity of 20 to 50%.

20. The ceramic dynamic-pressure bearing as claimed in claim 18, wherein the rotary surface of the spindle and/or the bearing formed of a ceramic having a surface porosity of 10 to 60% is a radial rotary surface formed at a certain position in the radial direction relative to the axis of the rotation body.

21. The ceramic dynamic-pressure bearing as claimed in claim 18, wherein the rotary surface of the spindle and/or the bearing formed of a ceramic having a surface porosity of 10 to 60% is a thrust rotary surface formed at a certain location in the thrust direction relative to the axis of the rotation body.

22. The ceramic dynamic-pressure bearing as claimed in claim 18, wherein inclination of the rotation body during rotation is restricted by a radial rotary surface formed at a certain position in the radial direction relative to the axis of the rotation body.

23. The ceramic dynamic-pressure bearing as claimed in claim 18, wherein inclination of the rotation body during rotation is restricted by a thrust rotary surface formed at a certain location in the thrust direction relative to the axis of the rotation body.

24. The ceramic dynamic-pressure bearing as claimed in claim 1, wherein said radius is formed at a corner portion where said groove sidewall surface and said groove bottom surface meet.

* * * * *